United States Patent [19]
Wenning et al.

[11] Patent Number: 5,792,487
[45] Date of Patent: Aug. 11, 1998

[54] CORRUGATED PLASTIC WALL PANELS

[75] Inventors: Larry Lee Wenning, Lakeland; Charles L. Beatty, Gainesville, both of Fla.

[73] Assignee: Witt Plastics of Florida Inc., Lakeland, Fla.

[21] Appl. No.: 630,274

[22] Filed: Apr. 10, 1996

[51] Int. Cl.$^6$ ................................................. B29C 53/26
[52] U.S. Cl. .................... 425/296; 425/303; 425/327; 425/336; 425/369; 264/151
[58] Field of Search .................. 264/151; 425/296, 425/303, 327, 336, 369, 374

[56]  References Cited

U.S. PATENT DOCUMENTS

| | | |
|---|---|---|
| 1,859,354 | 5/1932 | Buttress . |
| 1,866,690 | 7/1932 | Wilson ................................ 425/303 |
| 2,190,680 | 2/1940 | Rowe . |
| 2,655,978 | 10/1953 | Gonda et al. . |
| 2,811,196 | 10/1957 | Townsend et al. . |
| 2,811,745 | 11/1957 | Dowse et al. . |
| 2,876,824 | 3/1959 | West et al. . |
| 2,960,145 | 11/1960 | Ruegenberg . |
| 3,071,180 | 1/1963 | Finger et al. . |
| 3,220,056 | 11/1965 | Walton ................................ 425/369 |
| 3,356,555 | 12/1967 | Jackson .............................. 425/369 |
| 3,425,888 | 2/1969 | Kellicutt . |
| 3,517,098 | 6/1970 | Rasmussen . |
| 3,792,952 | 2/1974 | Hamon ............................... 425/369 |
| 3,843,758 | 10/1974 | Maroschak ........................ 425/303 |
| 3,999,924 | 12/1976 | Tanaka ............................... 425/369 |
| 4,116,603 | 9/1978 | Lindgren et al. ................. 425/369 |
| 4,174,945 | 11/1979 | Gertz . |
| 4,179,253 | 12/1979 | Lightfoot . |
| 4,614,632 | 9/1986 | Kezuka et al. ................... 425/369 |
| 4,829,145 | 5/1989 | Mitchell et al. . |
| 4,921,643 | 5/1990 | Walton et al. .................... 425/369 |
| 5,340,518 | 8/1994 | Paul . |

FOREIGN PATENT DOCUMENTS 237253  1/1962  Australia ................................ 425/303

OTHER PUBLICATIONS

Brochure, Coon Mfg., Inc., Spickard, Missouri, pp. 1–15.

*Primary Examiner*—James P. Mackey
*Attorney, Agent, or Firm*—Killworth, Gottman, Hagan & Schaeff LLP

[57]  ABSTRACT

A corrugated plastic panel is produced by providing a plastic panel corrugation device whereby a plastic material is extruded, a cooled extrusion is formed by passing the extrusion through a cooling roller assembly, a corrugated extrusion is formed by passing the cooled extrusion through a forming roller assembly when the cooled extrusion has reached its impressionable temperature range, a corrugated extrusion is passed through a pulling roller assembly when the corrugated extrusion has reached its hardening temperature range, and a corrugated plastic panel is formed by passing the corrugated extrusion through an extrusion cutting assembly.

2 Claims, 4 Drawing Sheets

CORRUGATED PLASTIC WALL PANELS

BACKGROUND OF THE INVENTION

The present invention relates to a method and apparatus for forming rigid plastic panels and the product produced thereby, and, more particularly, to a method and apparatus for making corrugated plastic wall panels and the product produced thereby.

U.S. Pat. No. 5,340,518, describes a thermo-forming apparatus for producing corrugated plastic panels. The process and apparatus described therein are problematic, however, because a plurality of temperature controlled heater units are required to raise the temperature of a preformed plastic sheet to an appropriate forming temperature. Further, a calibrator must be provided to receive the thermo-formed material and hold the material in its corrugated form as it cools. Finally, in order to produce corrugated panels according to the process described in the '518 patent, one or more supply spools, typically containing 8,000 to 10,000 feet of preformed sheet material must be provided, unwound, and fed into the thermo-forming apparatus.

Accordingly, there is a need for a method and apparatus for making corrugated plastic wall panels wherein it is not necessary to heat a preformed supply of plastic sheet material or to hold the corrugated plastic material in the corrugated form while the material cools to a hardening temperature. Further, there is a need for a method and apparatus for making corrugated plastic wall panels whereby corrugated panels may be continuously produced absent a supply of preformed sheet plastic material.

SUMMARY OF THE INVENTION

This need is met by the present invention wherein corrugated plastic panels are continuously produced by extruding a supply of plastic material, forming corrugations in the extrusion as the material is extruded, and cutting the corrugated extrusion into panels as the material is extruded.

In accordance with one embodiment of the present invention, an apparatus is provided for forming a corrugated plastic panel comprising: an extrusion assembly; a cooling roller assembly positioned to receive a plastic material extruded from the extrusion assembly, the plastic material having an extrusion temperature, a characteristic impressionable temperature range, and a characteristic hardening temperature range; a forming roller assembly positioned to receive the extruded plastic material from the cooling roller assembly when the extruded plastic material has reached the characteristic impressionable temperature range; a pulling roller assembly positioned to receive a corrugated extruded plastic material from the forming roller assembly when the corrugated extruded plastic material has reached the characteristic hardening temperature range; an extrusion cutting assembly positioned to receive the corrugated extruded plastic material from the pulling roller assembly and adapted to cut the corrugated extruded plastic material to form a corrugated sheet.

The extruded plastic material preferably comprises, but is not limited to, high density polyethylene having an extrusion temperature between approximately 450° F. and 500° F. (230° C. and 270° C.), a characteristic impressionable temperature range between approximately 250° F. and 300° F. (120° C. and 150° C.), and a characteristic hardening temperature range between approximately 150° F. and 170° F. (66° C. and 77° C.).

The cooling roller assembly may comprise a first, a second, and third cooling roller, the first cooling roller and the second cooling roller defining a first minimum passage gap between the first cooling roller and the second cooling roller, the first minimum passage gap being smaller than a minimum dimension of the extruded plastic material and being positioned to receive the extruded plastic material, the second cooling roller and the third cooling roller defining a second minimum passage gap between the second cooling roller and the third cooling roller the second minimum passage gap being positioned to receive the extruded plastic material after the extruded plastic material passes through the first minimum passage gap.

The forming roller assembly may comprise a corrugation plate and a series of corrugation rollers. The corrugation rollers may have a width of approximately 1.75" (4.45 cm) and a diameter of approximately 8" (20.3 cm). The corrugation plate may comprise a contoured base plate portion positioned to engage the extruded plastic material. The corrugation plate may comprise a series of corrugation gaps formed in the corrugation plate, each of the corrugation gaps being positioned to accommodate one of the corrugation rollers. The corrugation gaps preferably have a width of approximately 3.125" (7.94 cm) and a depth of approximately 3" (7.62 cm), while the corrugation rollers have a width of approximately 1.75" (4.45 cm). The corrugation gaps preferably have a spacing of between approximately 3.625" (9.26 cm) and 4.625" (11.8 cm). The corrugation gaps may comprise longitudinally oriented corrugation gaps. Specifically, the corrugation plate may comprise a series of parallel steel tubes or steel rods fixed to a plate frame, each of the steel tubes or rods being spaced from adjacent steel tubes or rods to define a plurality of corrugation gaps, each of the corrugation gaps is positioned to accommodate one of the corrugation rollers. The forming roller assembly may comprise a fixed corrugation plate and a series of hydraulically loaded corrugation rollers.

The corrugated plastic panel preferably includes an upper surface comprising an upper surface valley and an upper surface crest, wherein the upper surface crest is preferably from approximately 0" to 3" higher than the upper surface valley. The corrugated plastic panel includes an upper surface and a lower surface, and the upper surface is preferably spaced from the lower surface by a distance selected from the range of approximately 0.060" and 0.375" (1.52 mm and 9.52 mm).

The pulling roller assembly preferably comprises a series of upper pulling rollers and a single lower pulling roller positioned to mutually engage the corrugated extruded plastic material between the series of upper pulling rollers and the single lower pulling roller. The upper pulling rollers are preferably positioned to engage corrugated valleys in the corrugated extruded plastic material. Each of the upper pulling rollers preferably includes a rubber engagement surface while the lower pulling roller includes a scored rubber engagement surface wherein the scored rubber engagement surface preferably comprises a bi-directional spiral having a spiral frequency of two threads per inch, a score width of approximately 0.125" (3.175 mm), and a score depth of approximately 0.10" (2.54 mm), and longitudinal scores provided at approximately 0.5" (1.27 cm) intervals, and having a score groove width of approximately 0.125" (3.175 mm), and a score depth of approximately 0.10" (2.54 mm). The upper pulling rollers are preferably coupled to air cylinder presses.

The extrusion cutting assembly preferably comprises a movable rigid cutting assembly frame and a coupling assembly adapted to couple movement of the corrugated extruded plastic material with movement of the cutting assembly frame. The extrusion cutting assembly may comprise a movable rigid cutting assembly frame, a lateral extrusion saw track coupled to the cutting assembly frame, an extrusion saw coupled to the lateral saw track, and an extrusion clamping assembly coupled to the cutting assembly frame.

In accordance with another embodiment of the present invention, a process for forming a corrugated plastic panel is provided comprising the steps of: forming an extrusion of a plastic material having an extrusion temperature, a characteristic impressionable temperature range, and a characteristic hardening temperature range; forming a cooled extrusion by passing the extrusion through a cooling roller assembly; forming a corrugated extrusion by passing the cooled extrusion through a forming roller assembly when the cooled extrusion has reached the impressionable temperature range; passing the corrugated extrusion through a pulling roller assembly when the corrugated extrusion has reached the hardening temperature range; forming a corrugated plastic panel by passing the corrugated extrusion through an extrusion cutting assembly.

The corrugated extrusion forming step preferably includes the step of forcing a series of corrugation rollers towards a corrugation plate. The corrugated plastic panel forming step preferably comprises coupling the extrusion cutting assembly to the corrugated extrusion such that the cutting assembly moves with the corrugated extrusion while a selected length of corrugated extrusion is cut to form the corrugated plastic panel. Preferably, the corrugated extrusion is cut by moving a saw along a saw track across a width dimension of the corrugated extrusion.

Accordingly, it is an object of the present invention to provide a process and apparatus for forming corrugated plastic panels directly from an extrusion unit without interrupting the extrusion process. It is a further object of the present invention to provide a process and apparatus for forming corrugated plastic panels wherein the formed corrugations maintain their corrugated shape independent of any supplemental molds or clamps. Finally, it is an object of the present invention to provide a process and apparatus for forming corrugated plastic panels wherein complex heating and cooling units are not necessary.

DETAILED DESCRIPTION OF THE INVENTION

Figure 1:
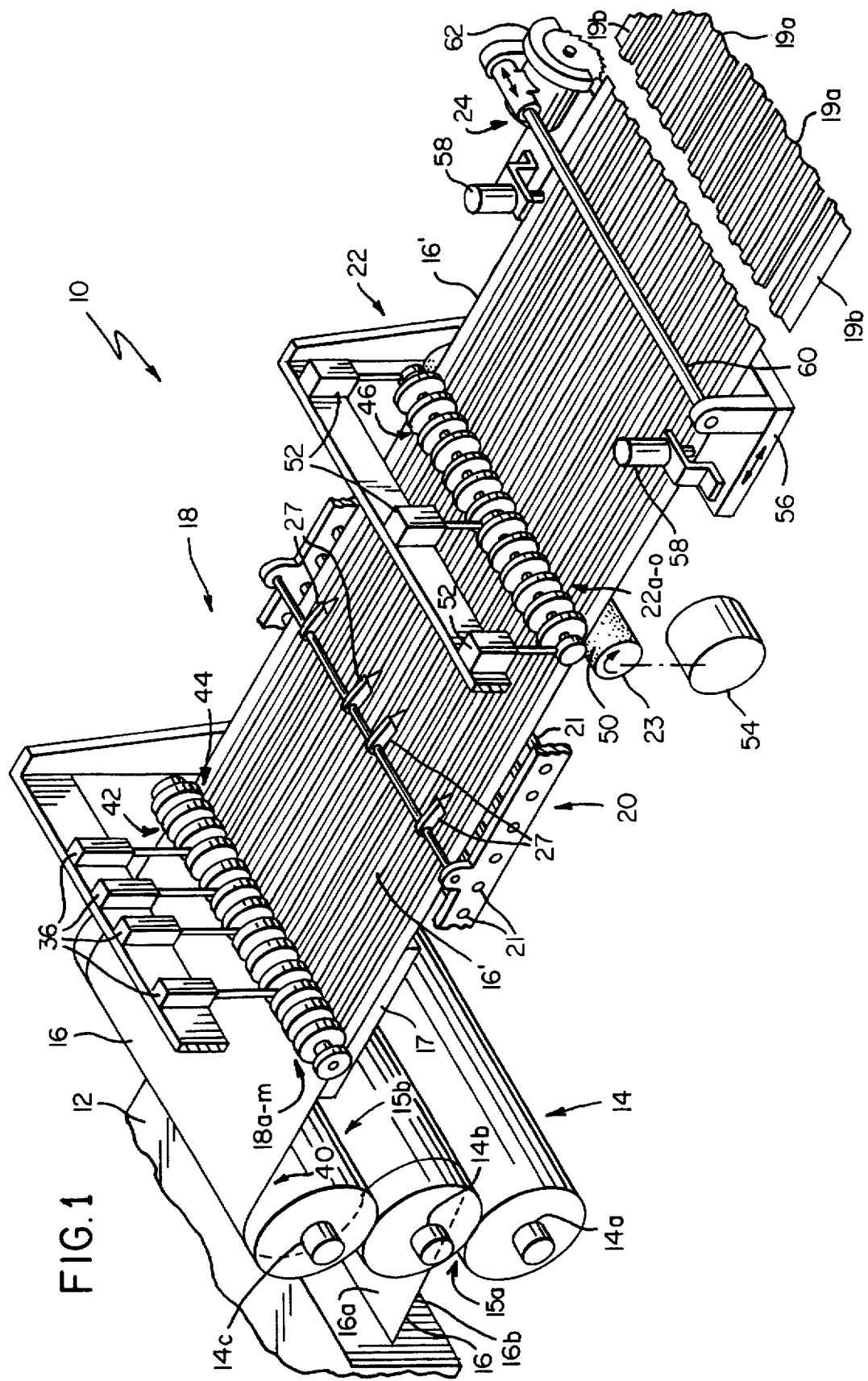
FIG. 1 is an illustration of an apparatus for forming corrugated plastic panels according to the present invention.
Figure 2:
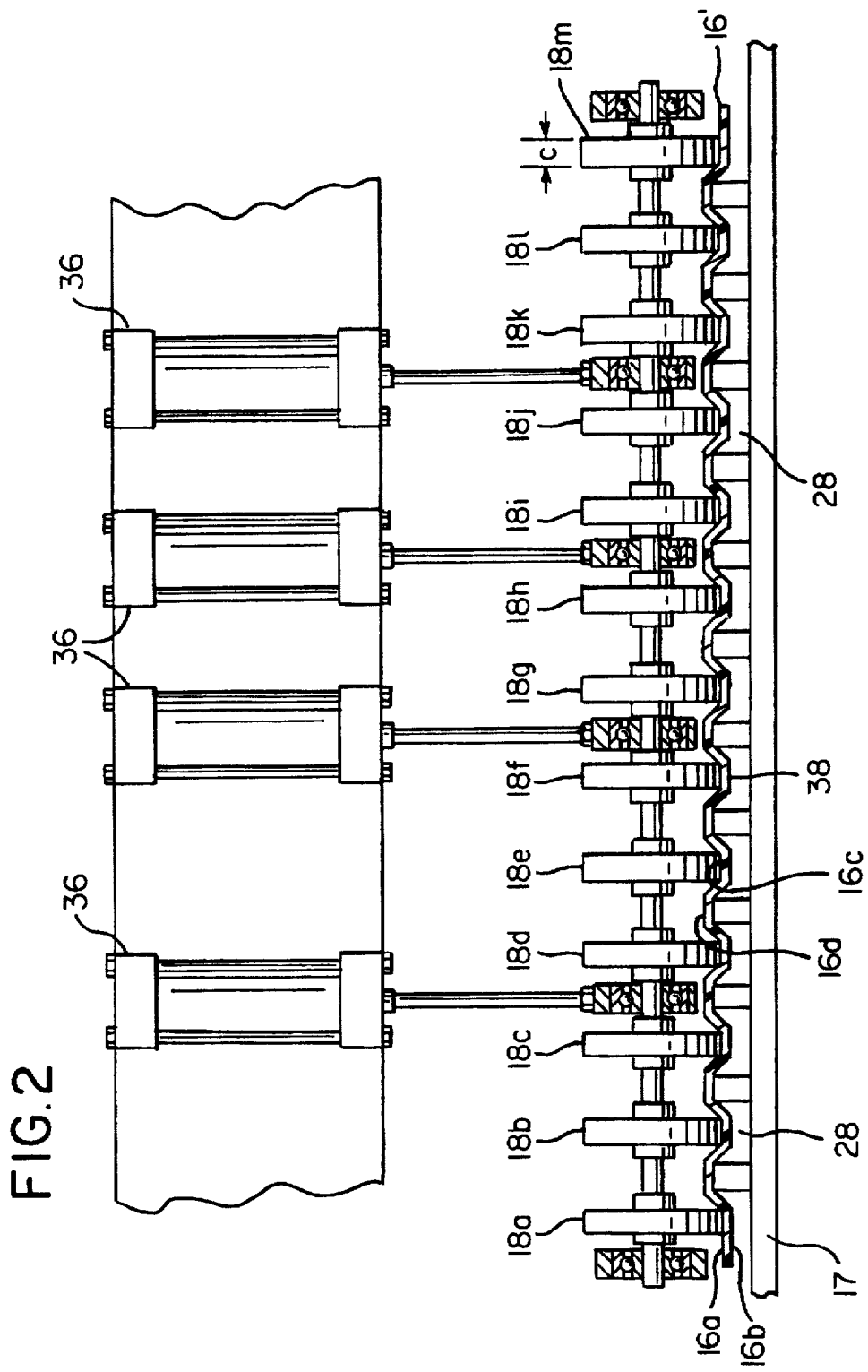
FIG. 2 is an illustration of a forming roller assembly according to the present invention.

The plastic panel corrugation device 10, illustrated in FIG. 1 comprises an extrusion assembly 12, a cooling roller assembly 14 positioned to receive a plastic material 16 extruded from the extrusion assembly 12, a forming roller assembly 18 positioned to receive the extruded plastic material 16 from the cooling roller assembly 14, a free air cooling section 20, a pulling roller assembly 22 positioned to receive a corrugated extruded plastic material 16' from the forming roller assembly 18, and an extrusion cutting assembly 24 positioned to receive the corrugated extruded plastic material from the pulling roller assembly 22 and adapted to cut the corrugated extruded plastic material 16' to form a corrugated plastic panel. Additionally, longitudinal cutters 27 are provided in the vicinity of the free air cooling section 20 down line from the forming roller assembly 18 at a location which permits efficient cutting of the corrugated extruded material 16', forming corrugated panels 19a of predetermined width down line from the extrusion cutting assembly 24. Longitudinal cutters 27 are also provided near the lateral edges of the corrugated extruded material in order to trim off excess non-corrugated plastic extrusion 19b.

The plastic material 16, preferably high density polyethylene (HDPE), extruded from the extrusion assembly 12 continuously approaches the cooling roller assembly 14 at an extrusion temperature. For example, high density polyethylene is extruded at a temperature of between approximately 450° F. and 500° F. (230° C. and 270° C.). It is contemplated by the present invention that the extruded material may be a material other than HDPE, e.g. polypropylene, or any other material capable of extrusion and corrugation. It is further contemplated by the present invention, that in order to enhance the stiffness of corrugated panels produced according to the present invention at lower densities, a foamed material may be extruded from the extrusion assembly 12. Further, reinforcement materials may be added to the extruded material in the form of substantially spherical particles, e.g., glass beads, calcium carbonate beads, etc., platelet particles, e.g., mica, aluminum, and glass flakes, and fibers, e.g., graphite, glass, metal, etc.

First, second, and third cooling rollers 14a, 14b and 14c, preferably steel core rollers having a smooth chrome outer surface, are coupled to a roller drive mechanism and driven thereby. The cooling rollers 14a, 14b, 14c decrease the temperature of the extruded plastic material 16 by directly contacting upper and lower surfaces 16a, 16b of the extruded plastic material 16. The temperature decrease effected by the cooling roller assembly 14 reduces the temperature of the extruded plastic material from its extrusion temperature to its characteristic impressionable temperature range. A material's characteristic impressionable temperature range is a range in which an extruded plastic material becomes capable of supporting or retaining impressions or deformations formed in its cross section. For example, high density polyethylene has a characteristic impressionable temperature in the range of between approximately 250° F. and 300° F. (120° C. and 150° C.) and is contacted by chrome cooling rollers operating at a temperature of approximately 235° F. (113° C.) when extruded according to the present invention at a temperature of between approximately 450° F. and 500° F. (230° C. and 270° C.). The heat capacity of the cooling rollers 14a, 14b, 14c, the heat of the extruded material 16, and the exposure of the cooling rollers 14a, 14b, 14c to the ambient contribute to maintain the temperature of the rollers 14a, 14b, 14c in a desired range, e.g. a temperature of approximately 235° F. (113° C.). It is contemplated by the present invention, however, that the temperature of the chrome cooling rollers may be automatically controlled using heating and/or cooling means as necessary.

The extruded plastic material 16 has generally uniform width and thickness dimensions prior to its passage through the cooling roller assembly 14. However, the cooling roller assembly 14 is arranged to further define the thickness and width dimensions of the continuously extruded plastic material 16. Specifically, the first cooling roller 14a and the second cooling roller 14b define a first minimum passage gap 15a between the first cooling roller 14a and the second cooling roller 14b. The first minimum passage gap 15a is positioned to receive the extruded plastic material 16, has a width dimension at least as large as the width dimension of the extruded plastic material 16, and has a height dimension smaller than a minimum thickness dimension of the extruded plastic material 16. Similarly, the second cooling roller 14b and the third cooling roller 14c define a second minimum passage gap 15b between the second cooling roller 14b and the third cooling roller 14c. The second minimum passage gap 15b is positioned to receive the extruded plastic material 16 after the extruded plastic material 16 passes through the first minimum passage gap 15a. The second minimum passage gap 15b also has a width dimension at least as large as the width dimension of the extruded plastic material 16 and a height dimension which is also smaller than a minimum thickness dimension of the extruded plastic material 16. It is contemplated by the present invention that the height dimension of the second minimum passage gap 15b may also be smaller than that of the first passage gap 15a if a further reduction in extruded material thickness is desired. It is further contemplated by the present invention that at least one of the first, second, and third cooling rollers 14a, 14b, 14c may impart a predetermined surface texture to the extruded plastic material 16. Preferably, the cooling rollers 14a, 14b, 14c impart a smooth surface texture to the extruded plastic material 16.

When the continuously extruded plastic material 16 reaches its characteristic impressionable temperature range in the manner described above, the extruded plastic material 16 enters the forming roller assembly 18, including the free air cooling section 20. Specifically, the forming roller assembly 18 is positioned down line from the cooling roller assembly at a distance from the cooling roller assembly 14 which corresponds to the distance necessary for the extruded material 16 to reach its characteristic impressionable temperature range. For example, in the case of HDPE extruded at a temperature of 450°–500° F. (230°–270° C.), the distance from a last cooling roller contact point 40 to a first forming roller contact point 42 is between approximately 18" and 20" (46 cm and 51 cm).

The forming roller assembly 18 is described with reference to FIGS. 1–4 and comprises a corrugation plate 17 and a series of corrugation rollers 18a–18m. The corrugation rollers 18a–18m have a width of approximately 1.75" (4.45 cm) and a diameter of approximately 8" (20.3 cm). The corrugation plate 17 comprises a series of corrugation gaps 28 formed in the corrugation plate 17, each of the corrugation gaps 28 being positioned to accommodate one of the corrugation rollers 18a–18m. The corrugation gaps 28 preferably have a width a of approximately 3.125" (7.94 cm) and a depth b of approximately 3" (7.62 cm), while the corrugation rollers 18a–18m have a width c of approximately 1.75" (4.45 cm). The corrugation gaps 28 preferably have a spacing d of between approximately 3.625" (9.26 cm) and 4.625" (11.8 cm). The corrugation gaps are preferably longitudinally oriented with respect to the extruded plastic material 16, i.e., the longitudinal axis of each gap 28 is parallel to the direction of travel of the extruded plastic material 16. The longitudinal dimension e of the corrugation gaps is large enough to permit sufficient formation of a corrugated panel according to the present invention and is preferably between approximately 22" (56 cm) and 36" (91 cm). It is contemplated by the present invention that the spacing of the corrugation gaps 28 may be varied and that one corrugation gap 28 may be arranged to accommodate more than one corrugation roller 18a–18m.

Figure 3:
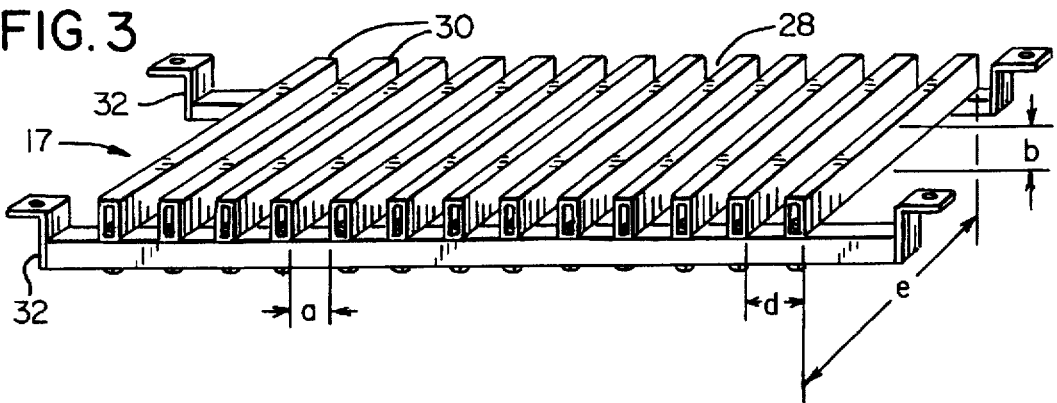
FIGS. 3 and 4 illustrate alternative corrugation plate designs according to the present invention.

The corrugation plate 17 illustrated in FIG. 3 comprises a series of parallel steel tubes 30, having a tube width of approximately 1.5" (3.8 cm), fixed to a plate frame 32, each of the steel tubes 30 is spaced from adjacent steel tubes 30 to define a plurality of 3.125" (7.194 cm) wide and 3" (7.62 cm) deep corrugation gaps 28. As noted above with reference to FIG. 2, the corrugation gaps 28 are positioned to accommodate respective corrugation rollers 18a–18m. In this manner, when the extruded plastic material 16 passes through the forming roller assembly 18, hydraulic presses 36 may be activated to urge the corrugation rollers 18a–18m in the direction of the extruded plastic material 16 and in the direction of the corrugation plate 17 to impress longitudinal corrugations 38 in the extruded plastic material 16. Preferably, as much as 5–6" (13–15 cm) of excess plastic extrusion are provided at the edges of the extruded material 16 to ensure that each of the corrugation gaps 28 are occupied by the plastic extrusion material 16.

Figure 4:
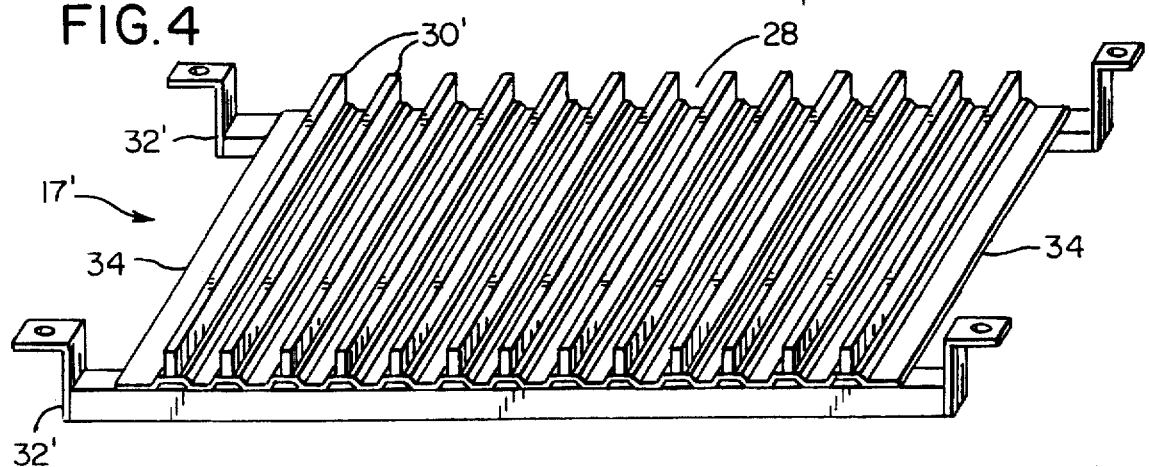
Figure 5:
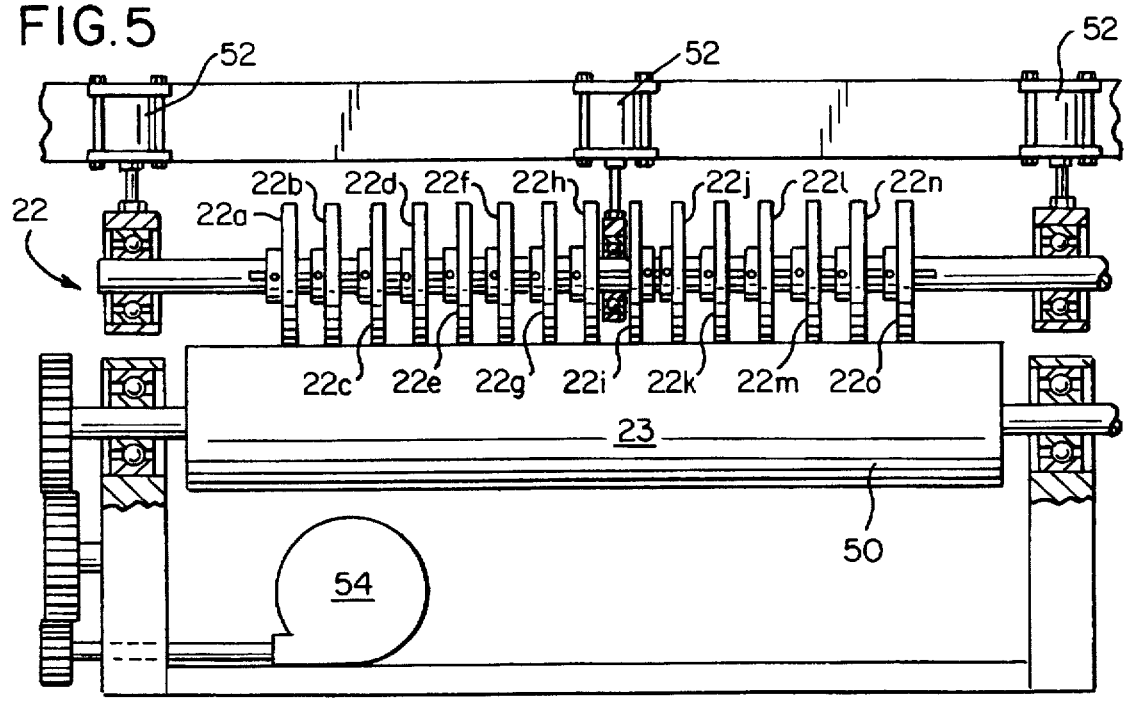
FIG. 5 is an illustration of a pulling roller assembly according to the present invention.

The corrugation plate 17' illustrated in FIG. 4 comprises a series of parallel steel rods 30', having a rod width of approximately 0.5" (1.3 cm), fixed to a plate frame 32', each of the steel rods 30' is spaced from adjacent steel rods 30' to define a plurality of 3.125" (7.194 cm) wide and 1" (2.54 cm) deep corrugation gaps 28. The corrugation plate 17' further includes a contoured base plate portion 34 positioned to engage extruded plastic material 16 forced into the corrugation gaps 28 by the above described force applied by the hydraulic presses 36 and corrugation rollers 18. The engagement of the contoured base plate portion 34 with the extruded plastic material 16 imparts the contour of the contoured base plate portion to the lower surface 16a of the extruded plastic material 16.

As plastic material is extruded from the extrusion assembly 12, a corrugated extruded plastic material 16' passes from between the corrugation rollers 18a–18m and the corrugation plate 17 and enters a free air cooling section 20. Spaced conveying rollers 21 are provided in the free air cooling section to ensure that the upper and lower sides 16a, 16b of the extruded corrugated plastic material 16' are exposed to the ambient and cooled evenly. Free air, or air in the ambient, cools the corrugated extruded plastic material 16' from the characteristic impressionable temperature range to a characteristic hardening temperature range. For example, HDPE has a characteristic hardening temperature in the range of between approximately 150° F. and 170° F. (66° C. and 77° C.). A material's hardening temperature range is a range of at which a plastic material is rigid and non-ductile. It is contemplated by the present invention that, in order to ensure even cooling within the free air cooling section 20, cooling fans may be provided in the vicinity of the plastic panel corrugation device 10 to circulate air throughout the free air cooling section 20.

The upper surface 16a of the corrugated plastic extrusion 16' includes upper surface valleys 16c and an upper surface crests 16d. Each upper surface crest 16d is from approximately 0" to 3" higher than each upper surface valley 16c. The lower surface 16b of the corrugated plastic extrusion 16' is spaced from the upper surface 16a by a distance selected from the range of approximately 0.060" and 0.375" (1.52 mm and 9.52 mm). It is contemplated by the present invention that a spacing, i.e. minimum extrusion thickness, smaller that 0.060" (1.52 mm) may be selected provided supplemental heating is supplied in the vicinity of the extrusion assembly 12, the cooling roller assembly 14, and/or the forming roller assembly 18 in order to prevent premature cooling of the plastic extruded material 16. It is further contemplated by the present invention that an increase in the separation between the crest 16d and the valley 16c is preferred where there is a decrease in the upper surface 16a to lower surface 16b spacing. The separation between the crest 16d and the valley 16c is preferably 0.5" where the upper surface 16a to lower surface 16b spacing is 0.25".

When the corrugated extruded plastic material 16' reaches its characteristic hardening temperature range in the manner described above, the corrugated extruded plastic material 16' enters the pulling roller assembly 22, which acts to pull the corrugated extruded plastic material 16' in a down line direction. Specifically, the pulling roller assembly 22 is positioned down line from the forming roller assembly 18 at a distance which corresponds to the distance necessary for the corrugated extruded plastic material 16' to reach its characteristic hardening temperature range. For example, in the case of HDPE extruded at a temperature of 450°–500° F. (230°–270° C.), the distance from a last forming roller contact point 44 to a first pulling roller contact point 46 is between approximately 18 ft. and 20 ft. (5.5 m and 6.1 m).

The pulling roller assembly 22 is described with reference to FIG. 4 and comprises a series of upper pulling rollers 22a–22o and a single lower pulling roller 23. The upper pulling rollers are coupled to three pulling roller air cylinder presses 52 which each exert approximately 120 psi on the upper pulling rollers 22a–22o in the direction of the lower pulling roller 23. The upper pulling rollers 22a–22o are positioned to engage only the corrugated valleys 16c in the corrugated extruded plastic material 16'. The upper pulling rollers 22a–22o and the lower pulling roller 23 are driven by a suitable driving mechanism 54 and are positioned to forcefully and rotatably engage therebetween the corrugated extruded plastic material 16' thereby imparting a down line pulling force to the corrugated extruded plastic material 16'.

Each of the upper pulling rollers 22a–22o includes a metallic, preferably steel, roller core having a rubberized outer rolling surface, i.e. a rubber engagement surface. The lower pulling roller 23 includes a metallic roller core having a rubberized and scored outer rolling surface, i.e. a scored rubber engagement surface 50. The rubber used to form the engagement surfaces of the pulling roller assembly 22 has approximately a 45–50 durometer hardness.

Figure 6:
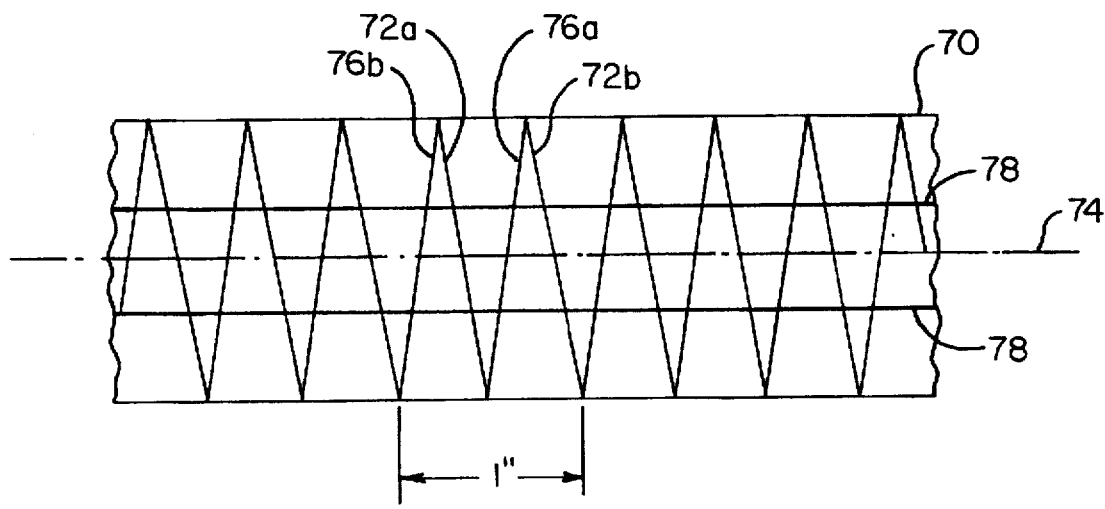
FIG. 6 is an illustration of a bi-directional spiral in accordance with the present invention.

The scored rubber engagement surface 50 comprises a bi-directional spiral having a spiral frequency of two threads per inch, a score groove width of approximately 0.125" (3.175 mm), and a score depth of approximately 0.10" (2.54 mm). In addition, longitudinal scores are provided along the length of the lower pulling roller 23. The longitudinal scores are provided at approximately 0.5" (1.27 cm) intervals and also have a score groove width of approximately 0.125" (3.175 mm), and a score depth of approximately 0.10" (2.54 mm). The bi-directional spiral is created by first scoring the engagement surface 50 in a first spiral direction parallel to the axis of the lower pulling roller 23 along a first spiral path and then by scoring the engagement surface 50 in a reverse spiral direction parallel to the roller axis along a second spiral path oriented opposite to the first spiral path. Each spiral path is characterized by a spiral frequency of two threads per inch. FIG. 6 is a side view of a cylindrical structure 70 including a bi-directional spiral having a spiral frequency of approximately two threads per inch. Every inch of cylindrical length includes two threads 72a and 72b of a spiral oriented in a first direction parallel to the cylindrical axis 74 and two threads 76a and 76b of a spiral oriented in a reverse direction parallel to the cylindrical axis 74. FIG. 6 also shows longitudinal scores 78 provided along the length of the cylindrical structure 70.

The extrusion cutting assembly 24 is positioned to receive the corrugated extruded plastic material 16' from the pulling roller assembly 22 and is adapted to cut the corrugated extruded plastic material 16' to form a corrugated plastic panel 19a of a predetermined length. The extrusion cutting assembly 24 comprises a movable rigid cutting assembly frame 56 and an extrusion clamping assembly 58 adapted to couple movement of the cutting assembly frame 56 with movement of the corrugated extruded plastic material 16' as the plastic material 16 is extruded from the extrusion assembly 12. A lateral extrusion saw track 60 is coupled to the cutting assembly frame 56 and an extrusion saw 62 is coupled to the lateral saw track 60.

A corrugated panel 19a is cut to a predetermined length by activating the extrusion clamping assembly 58 to couple the movable cutting assembly frame 56 to the movement of the corrugated extrusion 16' such that the entire cutting assembly 24, including the saw track 60 and saw 62, moves in a down line direction with the corrugated extrusion 16'. A selected length of corrugated extrusion 16' is cut to form the corrugated plastic panel 19a by activating the extrusion saw 62 coupled to the moving cutting assembly frame 56. The extrusion saw 62 is guided along the saw track 60 to move and cut across the width of the corrugated extrusion 16' while the corrugated extrusion 16' moves down line.

The extruded plastic material may be threaded through the plastic panel corrugation device 10 according to a number of well known extrusion threading methods. For example, craft paper or heavy gauge wrapping paper may be pre-threaded through the plastic panel corrugation device, coupled to the start of an extrusion at the extrusion assembly 12, and used to draw the extrusion through the corrugation device 10. Further, as will be appreciated by those familiar with plastic extrusion, a brief start up period will be required in practicing the above described invention to achieve uniform extrusion thickness, finish, corrugation, etc.

Having described the invention in detail and by reference to preferred embodiments thereof, it will be apparent that modifications and variations are possible without departing from the scope of the invention defined in the appended claims.

What is claimed is:

1. An apparatus for forming a corrugated plastic panel comprising:

an extrusion assembly operative to produce a sheet of extruded plastic material having an extrusion temperature, a characteristic impressionable temperature range, and a characteristic hardening temperature range;

a cooling roller assembly positioned to receive said extruded plastic material;

a forming roller assembly operative to produce a corrugated extruded plastic material and positioned to receive said extruded plastic material from said cooling roller assembly when said extruded plastic material has reached said characteristic impressionable temperature range;

a pulling roller assembly positioned to receive said corrugated extruded plastic material from said forming roller assembly when said corrugated extruded plastic material has reached said characteristic hardening temperature range, wherein said pulling roller assembly includes a scored rubber engagement surface, and wherein said scored rubber engagement surface comprises a bidirectional spiral score having a spiral frequency of two threads per inch, a score groove width of approximately 0.125" (3.175 mm), and a score depth of approximately 0.10" (2.54 mm), and longitudinal scores provided at approximately 0.5" (1.27 cm) intervals, and having a score groove width of approximately 0.125" (3.175 mm), and a score depth of approximately 0.10" (2.54 mm); and an extrusion cutting assembly positioned to receive said corrugated extruded plastic material from said pulling roller assembly and adapted to cut said corrugated extruded plastic material to form a corrugated plastic panel.

2. An apparatus for forming a corrugated plastic panel comprising:

a an extrusion assembly operative to produce a sheet of extruded plastic material having an extrusion temperature, a characteristic impressionable temperature range, and a characteristic hardening temperature range;

a cooling roller assembly positioned to receive said extruded plastic material;

a forming roller assembly operative to produce a corrugated extruded plastic material and positioned to receive said extruded plastic material from said cooling roller assembly when said extruded plastic material has reached said characteristic impressionable temperature range;

a pulling roller assembly positioned to receive said corrugated extruded plastic material from said forming roller assembly when said corrugated extruded plastic material has reached said characteristic hardening temperature range; and an extrusion cutting assembly positioned to receive said corrugated extruded plastic material from said pulling roller assembly and adapted to cut said corrugated extruded plastic material to form a corrugated plastic panel, wherein said extrusion cutting assembly comprises a movable rigid cutting assembly frame, a lateral extrusion saw track coupled to said cutting assembly frame, an extrusion saw coupled to said lateral saw track, and an extrusion clamping assembly coupled to said cutting assembly frame.

* * * * *